United States Patent [19]

Stokes

[11] Patent Number: 4,724,348
[45] Date of Patent: Feb. 9, 1988

[54] ROTATABLE ASSEMBLY FOR DYNAMOELECTRIC MACHINES HAVING MEANS FOR REDUCING RELEASE OF MAGNET MATERIAL PARTICLES THEREFROM

[75] Inventor: Vijay K. Stokes, Schenectady, N.Y.

[73] Assignee: General Electric Company, Schenectady, N.Y.

[21] Appl. No.: 677,448

[22] Filed: Dec. 3, 1984

[51] Int. Cl.⁴ .................................... H02K 21/00
[52] U.S. Cl. ........................ 310/152; 310/156; 335/303
[58] Field of Search ............... 310/152–156, 310/43; 335/302–306

[56] References Cited

U.S. PATENT DOCUMENTS

| | | | |
|---|---|---|---|
| 2,632,123 | 3/1953 | Kober | 310/156 |
| 3,221,194 | 11/1965 | Blackburn | 310/156 |
| 3,246,187 | 4/1966 | Iemura | 310/156 |
| 3,258,623 | 6/1966 | Phelon et al. | 310/156 |
| 3,390,291 | 6/1968 | Eberline et al. | 310/156 |
| 3,531,670 | 9/1970 | Loudon | 310/156 |
| 3,968,390 | 7/1976 | Yasuda et al. | 310/156 |
| 4,012,651 | 3/1977 | Burson | 310/153 |
| 4,227,105 | 10/1980 | Kumakura | 310/153 |
| 4,242,610 | 12/1980 | McCarty et al. | 310/156 |
| 4,327,302 | 4/1982 | Hershberger | 310/156 |

Primary Examiner—Donovan F. Duggan
Attorney, Agent, or Firm—William H. Steinberg; James C. Davis, Jr.; Paul R. Webb, II

[57] ABSTRACT

A magnet assembly having means for reducing release of magnet material particles from the magnet element includes a body of permanently magnetizable material and a shell at least partially surrounding the body. The shell is disposed and located so as to reduce release of particles shed from the surface portion of the body which is surrounded by the shell, and is preferably attached to the body by an adhesive which bonds the adjacent surfaces of the shell and the body together. A plurality of such magnet assemblies may be fastened to a flux ring in order to provide a rotatable assembly for a dynamoelectric machine in which migration of magnet material particles into the stator-rotor air gap is reduced. In accordance with a preferred embodiment, the magnet assemblies of the present invention are employed in a molded rotor assembly for such a machine.

6 Claims, 7 Drawing Figures

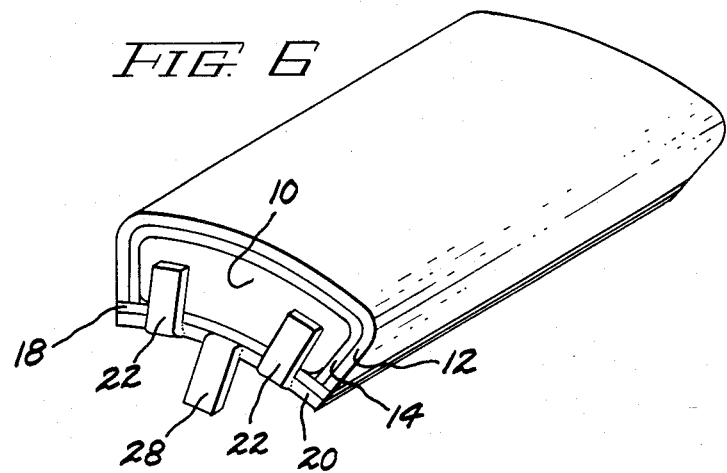
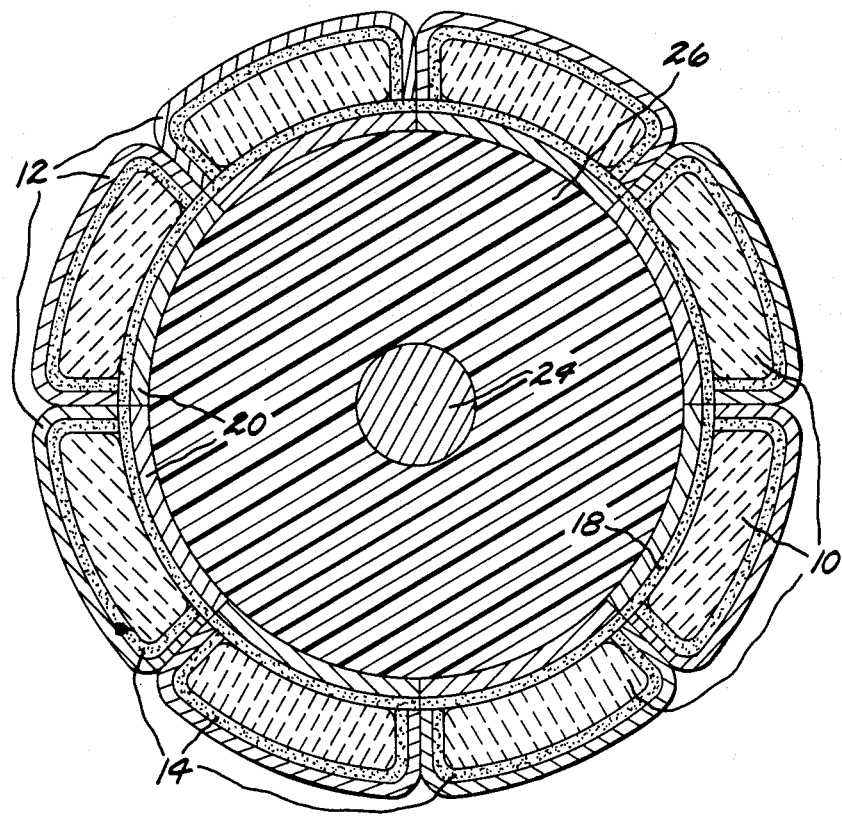

ROTATABLE ASSEMBLY FOR DYNAMOELECTRIC MACHINES HAVING MEANS FOR REDUCING RELEASE OF MAGNET MATERIAL PARTICLES THEREFROM

BACKGROUND OF THE INVENTION

This invention relates to rotatable assemblies for dynamoelectric machines, such as electronically commutated motors. More particularly, it relates to a means for reducing shedding of particles from the permanently magnetizable materials which are typically employed to form the magnet elements for such machines.

In conventional designs of rotatable assemblies for dynamoelectric machines, such as, for example, electronically commutated motors, permanent magnet elements are fastened to the outer surface of a steel drum which is attached to a rotatable shaft. In such designs, the permanent magnet elements form the outer surface of the rotor assembly. The permanent magnet elements typically used in electronically commutated motor rotors are formed from permanently magnetizable material which has been made by powder metallurgical techniques. These materials are brittle and have a tendency to release microscopic particles or chips from their surfaces, especially during rotation of the rotor assembly. Some of these released particles may migrate through the stator-rotor air gap and settle on the inner surface of the stator, thereby affecting the stator-rotor gap and degrading motor performance.

Various schemes have been employed to retain magnet material elements, such as permanent magnets or the like, against displacement from their proper positions in a rotatable assembly for dynamoelectric machines. It would appear that some of these schemes would also serve, at least in part, to reduce migration of magnet material particles into the stator-rotor gap. One such scheme is disclosed in U.S. Pat. Nos. 4,242,610, issued Dec. 30, 1980 to F. B. McCarty et al., and 3,531,670, issued Sept. 29, 1970 to D. C. Loudon. Those patents appear to describe heat shrinking a metal or metal alloy sleeve or band about the rotor core into displacement-preventing engagement with a set of magnet material elements arranged or otherwise seated in assembly positions about the circumference of the rotor core. While such an arrangement appears to at least partially reduce migration of magnet material particles from the outer surfaces of the magnet elements, this prior art arrangement requires undesirable heating during assembly, is too bulky and cumbersome for some applications, and is relatively expensive. To provide the metallic bands disclosed in those patents with adequate strength to hold the magnet elements in position, a relatively thick material must be used. Furthermore, even if the magnet elements are fastened to the rotor core by a supplementary means such as adhesive bonding, it is still difficult to provide such bands with adequate strength using a thin material. In addition to the hoop stresses in the metallic band generated during rotation of the rotor assembly by centrifugal forces acting on the band's own mass, radial expansion of the rotor assembly during rotation also imposes stresses on the band. The amount of radial expansion of the rotor assembly is expected to be greater than that of the metallic band for several reasons. First, during rotation the flux ring exhibits an incremental expansion due to centrifugal loading by the attached magnet elements. Also, if the magnet elements are adhesively bonded to the flux ring, the magnet elements tend to move radially at a different expansion rate than that of the metallic band, due to the low elastic modulus of the adhesive. Additionally, if the rotor core is made of plastic, the rotor core also tends to radially expand at a different rate than the metallic band, because of the core's lower elastic modulus. To withstand the stresses imposed by these mechanisms, the metallic bands disclosed by U.S. Pat. Nos. 4,242,610 and 3,531,670 appear to require relatively high mechanical strength. U.S. Pat. No. 3,221,194, issued Nov. 30, 1965 to A. B. Blackburn, also appears to disclose a scheme which would tend to reduce migration of magnet material particles into the stator-rotor gap. That patent describes dipping a rotor core with permanent magnet material elements arranged thereon into a plastic bath. When cured, the plastic forms an encapsulating layer over both the rotor core and the magnet elements, securing them together. However, for similar reasons as discussed above, such a plastic layer would also be subjected to both hoop stresses and stresses imposed by radial expansion of the rotor assembly during rotation.

Accordingly, it is an object of the present invention to provide a magnet assembly having means for reducing release of magnet material particles from the surface of the magnet element.

It is a further object of the present invention to provide a rotatable magnet assembly in which the stresses imposed on the means employed for reducing release of magnet material particles from the magnet elements, caused by radial expansion of the assembly during rotation, are reduced.

It is another object of the present invention to provide a rotatable assembly for dynamoelectric machines in which migration of magnet material particles into the stator-rotor gap is reduced.

SUMMARY OF THE INVENTION

In accordance with one aspect of the present invention, a magnet assembly having means for reducing release of magnet material particles therefrom comprises a body of permanently magnetizable material and a shell at least partially surrounding the body. The shell is disposed and located so as to reduce release of particles shed from the surface portion of the body which is surrounded by the shell, and is preferably attached to the body by an adhesive which bonds the adjacent surfaces of the shell and the body together.

In accordance with another aspect of the present invention, a plurality of such magnet assemblies are fastened to a flux ring in order to provide a rotatable assembly for a dynamoelectric machine. The magnet assemblies are disposed about the outer circumference of the flux ring so that they are situated adjacent to each other and so that the outer surfaces of the magnet assemblies form the curved surface of a cylinder. The rotatable assembly may also include an axial shaft extending along the central axis of the flux ring, and a matrix molded between the shaft and the inner circumference of the flux ring.

BRIEF DESCRIPTION OF THE DRAWINGS

The subject matter which is regarded as the invention is particularly pointed out and distinctly claimed in the concluding portion of the specification. The invention itself, however, both as to its organization and its method of practice, together with further objects and advantages thereof, may best be understood by reference to the following description taken in conjunction with the accompanying drawings, in which:

FIG. 6 is a perspective view schematically illustrating a portion of another embodiment of a rotatable assembly for a dynamoelectric machine in accordance with this invention; and FIG. 7 is a cross-sectional end view schematically illustrating a molded rotor assembly in accordance with the present invention.

DETAILED DESCRIPTION OF THE PREFERRED EMBODIMENTS

Figure 1:
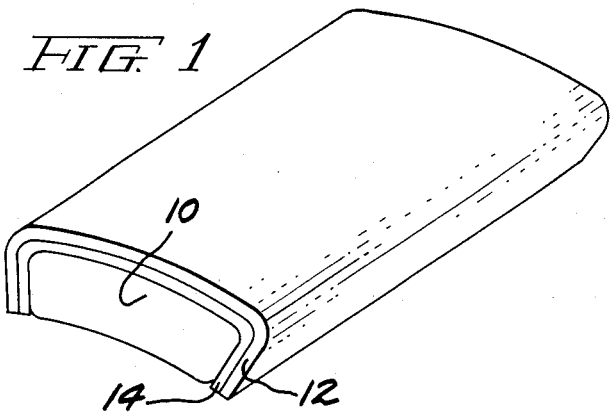
FIG. 1 is a perspective view schematically illustrating one embodiment of a magnet assembly in accordance with the present invention.

FIG. 1 schematically illustrates one embodiment of a magnet assembly having means for reducing release of magnet material particles therefrom, in accordance with the present invention. A body of permanently magnetizable material 10 is at least partially surrounded by shell 12, with shell 12 being disposed and located so as to reduce release of particles shed from the surface of body 10 which is surrounded by shell 12. Attaching means 14 serves to attach shell 12 to body 10. As shown in the cross-sectional views of FIGS. 2–4, attaching means 14 preferably comprises an adhesive which bonds the adjacent surfaces of body 10 and shell 12 together. Cladding the surface of body 10 by means of shell 12 and adhesive attaching means 14, in the manner illustrated in FIG. 1, results in containment of microscopic particles and chips that would otherwise be released from the surface of body 10. In order to minimize the effect of shell 12 on the magnetic performance of body 10, shell 12 preferably comprises a thin sheath of material which does not significantly affect the magnetic properties of body 10. In one embodiment, shell 12 comprises stainless steel foil.

Figures 2, 3, 4:
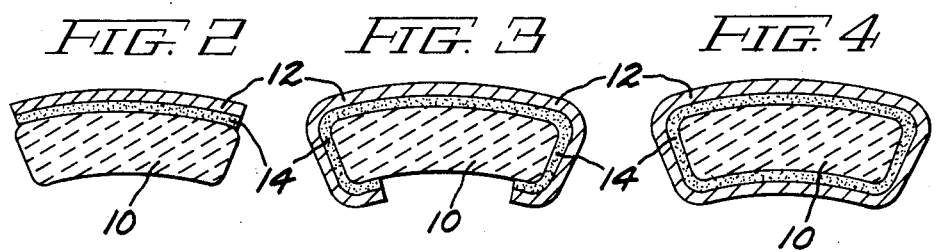
FIGS. 2–4 are cross-sectional end views schematically illustrating alternative embodiments to the embodiment shown in FIG. 1.

In the embodiment shown in FIG. 1, shell 12 is located adjacent to the top surface and to both side surfaces of body 10, so as to reduce release of particles shed from those three surfaces of body 10. FIGS. 2–4 are cross-sectional end views schematically illustrating alternative embodiments to that shown in FIG. 1. In the embodiment of FIG. 2, shell 12 is located adjacent to only the top surface of body 10, so as to reduce release of particles shed from that surface. In the embodiments of FIGS. 3 and 4, shell 12 is located adjacent to the top surface, both side surfaces, and at least a portion of the bottom surface of body 10, so as to reduce release of particles shed from the top surface, from both side surfaces, and from at least a portion of the bottom surface of body 10. If the magnet assemblies illustrated in FIGS. 1–4 are to be mounted on a flux ring, with the bottom surface of body 10 attached to the outer surface of the flux ring, the embodiments shown in FIGS. 3 and 4 would likely result in a loss of magnetic flux between body 10 of permanently magnetizable material and the flux ring. Because, in the embodiment shown in FIG. 3, shell 12 only partially covers the bottom surface of body 10, the loss of magnetic flux would be smaller for that embodiment than for the embodiment shown in FIG. 4. However, for some applications, the embodiment of FIG. 4 may be preferred over that of FIG. 3, since the embodiment of FIG. 4 results in a more uniform magnetic flux pattern. As between the magnet assemblies of FIGS. 1 and 2, the embodiment shown in FIG. 1 provides a smoother overall outer surface for the magnet assembly, and is preferred for applications such as rotors for dynamoelectric machines.

Figure 5:
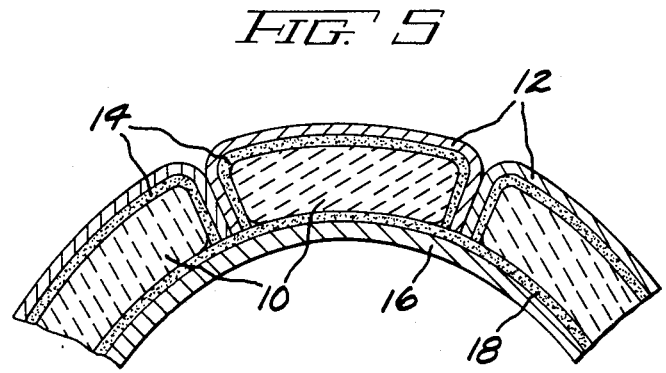
FIG. 5 is a cross-sectional end view schematically illustrating a portion of one embodiment of a rotatable assembly for a dynamoelectric machine in accordance with the present invention.

In each of the embodiments illustrated in FIGS. 1–4, body 10 of permanently magnetizable material has been shown as a generally bar-shaped body having generally arcuately shaped top and bottom surfaces. Although the principles of this invention apply to virtually any body shape, the bar-shaped bodies shown are especially useful for such applications as electronically commutated motors. FIG. 5 schematically illustrates a portion of one embodiment of a rotatable assembly for such a dynamoelectric machine, in accordance with the present invention. The rotatable assembly comprises flux ring 16, for providing a medium of distribution for magnetic flux, and a plurality of magnet assemblies disposed about the outer circumference of flux ring 16. In the embodiment shown in FIG. 5, the magnet assemblies are fastened to flux ring 16 by adhesive material 18. Each magnet assembly is of the type shown in FIG. 1, and includes generally bar-shaped body 10 of permanently magnetizable material, shell 12 at least partially surrounding body 10, and attaching means 14 for attaching shell 12 to body 10. For each magnet assembly, shell 12 is disposed and located so as to reduce release of particles shed from the surface of body 10 which is surrounded by shell 12. The magnet assemblies are fastened to flux ring 16 so that they are situated adjacent to each other and so that the outer surfaces of the magnet assemblies form the curved surface of a cylinder. With the outer surface and both side surfaces of each body 10 of permanently magnetizable material being surrounded by shell 12, and with the inner surface of each body 10 being attached to flux ring 16, in the manner shown in FIG. 5, the amount of magnet material particles released from the magnet material elements during rotation of the assembly is significantly reduced. Hence, the rotatable assembly of the present invention may be employed to advantage in a dynamoelectric machine in order to reduce migration of magnet material particles into and through the stator-rotor air gap. At the same time, the means employed for reducing release of magnet material particles does not require the use of materials having relatively high mechanical strength. In the rotatable assembly of the present invention, shell 12 is not subjected to stresses imposed by radial expansion of the assembly during rotation. Furthermore, since shell 12 may comprise a relatively thin material, the hoop stresses generated during rotation of the assembly by centrifugal forces acting on the mass of shell 12 are relatively small. Accordingly, the means for reducing release of magnet material particles employed by the present invention may comprise lightweight, relatively low strength materials.

In the embodiment of FIG. 5, the magnet assemblies are shown as being of the type illustrated in FIG. 1, with shell 12 of each magnet assembly being located adjacent to the outer surface and to both lateral surfaces of body 10 so as to reduce release of particles shed from those surfaces. However, the magnet assemblies illustrated in FIGS. 2–4 may also be used. As was noted above, shell 12 preferably comprises a material which does not significantly affect the magnetic performance of body 10 of permanently magnetizable material, such as, for example, stainless steel foil. Attaching means 14 preferably comprises an adhesive which bonds the adjacent surfaces of shell 12 and body 10 together.

In one embodiment of the rotatable assembly of the present invention, the flux ring employed comprises a unitary annular structure, illustrated in FIG. 5 as flux ring 16. FIG. 6 schematically illustrates a portion of an alternative embodiment in which the flux ring comprises a plurality of flux ring segments 20, with each flux ring segment 20 having mounted thereon one or more of the magnet assemblies shown in FIGS. 1-4. In the specific embodiment shown in FIG. 6, the magnet assembly of FIG. 1 is employed. As shown by the cross-sectional end view of FIG. 7, which schematically illustrates a molded rotor assembly in accordance with the present invention, in order to form a rotatable assembly, flux ring segments 20 are circumferentially arranged in a spaced-apart relationship about a central axis and held in position by a supporting means so that flux ring segments 20 form the general shape of an annulus. In the embodiment of FIG. 7, the supporting means comprises molded matrix 26. The rotatable assembly embodied by FIG. 7 may be formed, for example, by fastening one or more magnet assemblies to each flux ring segment 20, arranging the flux ring segments having the magnet assemblies fastened thereto in an appropriately shaped mold, and then molding in a matrix material, such as, for example, phenolic.

The means for fastening the plurality of magnet assemblies to either flux ring 16, shown in FIG. 5, or flux ring segments 20, shown in FIGS. 6 and 7, may comprise adhesive material 18 which bonds the magnet assemblies to either flux ring 16 or to flux ring segments 20, respectively. As illustrated in FIG. 6, the fastening means may also comprise a plurality of locking tabs 22, which may be formed as an integral part of either flux ring 16 shown in FIG. 5 or flux ring segments 20 shown in FIG. 6. Locking tabs 22 are disposed and located so that they are in gripping engagement with confronting parts of the magnet assemblies, so as to at least in part retain the magnet assemblies against displacement from their respective positions. Also, while the means for attaching matrix 26 to either flux ring 16 or flux ring segments 20 may comprise adhesive bonding, the attaching means may also comprise protuberances which are formed on either flux ring 16 or flux ring segments 20 and which are embedded in matrix 26. As illustrated in FIG. 6, in one embodiment the protuberances comprise anchoring tabs 28 which are formed as an integral part of either flux ring 16 or flux ring segments 20. Anchoring tabs 28 extend radially inwardly beyond the inner surface of either flux ring 16 or flux ring segments 20, for anchoring engagement in matrix 26. In the embodiment shown in FIG. 6, locking tabs 22 and anchoring tabs 28 are located at the axial ends of flux ring segments 20. However, other locations may be used, such as, for example, along the lateral surfaces of segments 20, or between the lateral surfaces of segments 20 in locations intermediate the axial ends of the segments.

In yet another embodiment of the present invention, the rotatable assembly described above is employed to form a molded rotor assembly for a dynamoelectric machine. As illustrated in FIG. 7, such a molded rotor assembly includes one of the embodiments of a rotatable assembly in accordance with the present invention, and further comprises axial shaft 24 and molded matrix 26. Shaft 24 extends along the central axis of the annularly shaped flux ring formed by either flux ring 16 shown in FIG. 5 or flux ring segments 20 shown in FIGS. 6 and 7. Matrix 26 is molded between shaft 24 and the inner circumference of the flux ring so that matrix 26 is at least in part in supporting relationship between shaft 24 and either flux ring 16 or flux ring segments 20. Each body 10 of permanently magnetizable material is at least partially surrounded by shell 12, in the manner shown in FIGS. 1-4. Regardless of which of the embodiments shown in FIGS. 1-4 is used, shell 12 covers at least the outer surface of each body 10, and the inner surface of each body 10 is attached to either flux ring 16 or flux ring segments 20. Hence, magnet material particles are constrained from being released during rotation of the molded rotor assembly, and the migration of such particles into the stator-rotor gap is reduced.

The foregoing describes a magnet assembly having means for reducing release of magnet material particles from the surface of the magnet element. The present invention also provides a rotatable magnet assembly in which the stresses caused by radial expansion of the assembly during rotation, and imposed on the means employed for reducing release of magnet material particles, are reduced. The present invention further provides a rotatable assembly for dynamoelectric machines in which migration of magnet material particles into the stator-rotor gap is reduced.

While the invention has been described in detail herein in accord with certain preferred embodiments thereof, many modifications and changes therein may be effected by those skilled in the art. For example, while body 10 of permanently magnetizable material has been shown in the Figures as comprising a ceramic, the principles of the present invention apply to other materials for which particle shedding is a problem. Also, for the sake of clarity in illustrating the present invention, shell 12 is not shown in any of the figures as covering the end surfaces of body 10. However, it should be understood that such surfaces could also be covered by shell 12, and that such an embodiment is included in the scope of the present invention. Furthermore, although not shown in the Figures, the flux ring to which the magnet assemblies of the present invention are mounted may comprise a steel drum in accordance with the conventional design, in which a plurality of stacked steel laminations are mounted on the outer surface of a steel shell. Accordingly, it is intended by the appended claims to cover all such modifications and changes as fall within the true spirit and scope of the invention.

The invention claimed is:
1. A magnet assembly comprising:
a body of permanently magnetizable material including top and bottom surfaces;
a shell comprising a thin layer of nonmagnetic material surrounding at least said top surface of only one body for reducing the release of particles therefrom; and
means disposed between said body and said shell for attaching said shell to said body;
said bottom surface of said body shaped for mounting on a generally cylindrical ring surface;
said body shaped such that at least two of said magnet assemblies can be mounted in adjoining relationship on said ring surface so that said top surfaces and said separate shells form a generally cylindrical outer surface overlying said ring surface.

2. The magnet assembly of claim 1 wherein said shell comprises stainless steel.

3. The magnet assembly of claim 1 wherein said means for attaching said shell to said body comprises an adhesive which bonds the adjacent surfaces of said shell and said body together.

4. The magnet assembly of claim 1 wherein said body of permanently magnetizable material comprises a generally bar shaped body further including two side surfaces connecting said top and bottom surfaces.

5. The magnet assembly of claim 4 wherein said shell surrounds said top surface and said two side surfaces of said body.

6. A magnet assembly comprising:
- a body of permanently magnetizable material including top and bottom surfaces, said body of permanently magnetizable material comprising a generally bar-shaped body further including two side surfaces;
- a shell comprising a thin layer of nonmagnetic material surrounding said top surface said two side surfaces and at least a portion of said bottom surface of said body for reducing the release of particles therefrom; and
- means disposed between said body and said shell for attaching said shell to said body;
- said bottom surface of said body shaped for mounting on a generally cylindrical ring surface;
- said body shaped such that at least two of said magnet assemblies can be mounted in adjoining relationship on said ring surface so that said top surfaces and said shells form a generally cylindrical outer surface overlying said ring surface.

* * * * *